(12) United States Patent
Takami (10) Patent No.: US 9,348,986 B2
(45) Date of Patent: May 24, 2016

(54) AUTHENTICATION SERVER APPARATUS, AUTHENTICATION SERVER APPARATUS-USE PROGRAM AND AUTHENTICATION METHOD

(75) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/388,925

(22) PCT Filed: Mar. 29, 2011

(86) PCT No.: PCT/JP2011/057813
§ 371 (c)(1),
(2), (4) Date: Feb. 3, 2012

(87) PCT Pub. No.: WO2011/122624
PCT Pub. Date: Oct. 6, 2011

(65) Prior Publication Data
US 2012/0144004 A1    Jun. 7, 2012

(30) Foreign Application Priority Data

Mar. 29, 2010 (JP) ................................. 2010-076169

(51) Int. Cl.
*G06F 21/31* (2013.01)
*G06F 21/32* (2013.01)
(Continued)

(52) U.S. Cl.
CPC .............. *G06F 21/316* (2013.01); *G06F 21/32* (2013.01); *G06F 21/36* (2013.01); *G06F 21/31* (2013.01); *G06F 2221/2133* (2013.01); *H04L 9/32* (2013.01); *H04L 63/08* (2013.01)

(58) Field of Classification Search
CPC ....... G06F 21/36; G06F 21/316; G06F 21/31; G06F 2221/2133; G06F 21/32; H04L 9/32; H04L 63/08

USPC .................................. 709/220, 229; 713/150
See application file for complete search history.

(56) References Cited

U.S. PATENT DOCUMENTS 6,209,104 B1    3/2001   Jalili
7,197,646 B2*   3/2007   Fritz et al. ..................... 713/182
(Continued)

FOREIGN PATENT DOCUMENTS

CN        1856782 A     11/2006
CN      101261669 A      9/2008
(Continued)

OTHER PUBLICATIONS

Chinese Office Action dated Jun. 27, 2013, issued in corresponding Chinese Patent Application No. 201180004009.4.
(Continued)

*Primary Examiner* — Gregory Todd
(74) *Attorney, Agent, or Firm* — Sughrue Mion, PLLC (57) ABSTRACT

An authentication server apparatus is capable of simply and accurately assessing whether a user terminal is being operated by a person. In the authentication server apparatus connected to the user terminal, operating instructions for instructing operation by an operator by using objects are associated with operation information and stored. A session ID is imparted for each session with the user terminal, operating instructions are selected for each session, a page provided with the selected operating instructions and the objects is generated, and position information is received corresponding to operations executed at the user terminal that has displayed the page. At authentication time, operating instructions using the session ID of the session are associated with position information received from the terminal, and using the stored operation information associated with the operating instruction that have been associated with the received position information, and the position information, an assessment is made of whether or not the operations were made by an operator.

12 Claims, 8 Drawing Sheets

(51) Int. Cl.
*G06F 21/36* (2013.01)
*H04L 9/32* (2006.01)
*H04L 29/06* (2006.01)

(56) References Cited

U.S. PATENT DOCUMENTS

| | | | |
|---|---|---|---|
| 7,552,467 B2* | 6/2009 | Lindsay | 726/5 |
| 7,725,395 B2* | 5/2010 | Rui et al. | 705/50 |
| 7,945,952 B1* | 5/2011 | Behforooz | 726/22 |
| 8,019,127 B2* | 9/2011 | Misra | 382/115 |
| 8,214,892 B2* | 7/2012 | Cohen et al. | 726/19 |
| 8,752,141 B2* | 6/2014 | Gross | 726/5 |
| 8,959,621 B2* | 2/2015 | Snelling | G06F 21/316 726/19 |
| 8,994,657 B2* | 3/2015 | Liberty | A61B 5/1101 178/18.01 |
| 2005/0008148 A1* | 1/2005 | Jacobson | 380/26 |
| 2005/0065802 A1 | 3/2005 | Rui et al. | |
| 2005/0138376 A1 | 6/2005 | Fritz et al. | |
| 2007/0143830 A1 | 6/2007 | Abraham et al. | |
| 2007/0239604 A1* | 10/2007 | O'Connell et al. | 705/50 |
| 2009/0094311 A1 | 4/2009 | Awadallah et al. | |
| 2009/0113294 A1* | 4/2009 | Sanghavi et al. | 715/269 |
| 2009/0138723 A1 | 5/2009 | Nyang et al. | |
| 2010/0070620 A1* | 3/2010 | Awadallah et al. | 709/224 |
| 2010/0287229 A1* | 11/2010 | Hauser | 709/203 |
| 2011/0016520 A1* | 1/2011 | Cohen et al. | 726/19 |
| 2011/0202762 A1* | 8/2011 | Hadad et al. | 713/164 |
| 2012/0047257 A1* | 2/2012 | Hauser | 709/224 |
| 2012/0144004 A1* | 6/2012 | Takami | 709/220 |

FOREIGN PATENT DOCUMENTS

| | | |
|---|---|---|
| CN | 101662458 A | 3/2010 |
| EP | 1868131 A1 | 12/2007 |
| JP | 2008-052727 A | 6/2008 |
| JP | 2009-266067 A | 11/2009 |
| WO | WO 2009/063761 A1 | 5/2009 |

OTHER PUBLICATIONS

Chinese Office Action dated Jan. 22, 2013 issued in corresponding Chinese Patent Application No. 201180004009.4.
Extended European Search Report dated May 13, 2013, issued in counterpart European Patent Application No. 11762848.7.

* cited by examiner

AUTHENTICATION SERVER APPARATUS, AUTHENTICATION SERVER APPARATUS-USE PROGRAM AND AUTHENTICATION METHOD

TECHNICAL FIELD

The present invention relates to a technical field of an authentication server device, an authentication server device-use program and an authentication method. More specifically, the present invention relates to a technical field of an authentication server device, an authentication server device-use program and an authentication method which authenticate whether or not, for example, an authentication requester is not a so-called bot but a person.

BACKGROUND ART

Conventionally, it is necessary to authenticate whether, in Internet and the like, data inputted in a user terminal is inputted by an operation by a person or is automatically inputted by a program and the like (that is, inputted by the above bot). More specifically, when a review article about such as a product, hotel is written, a comment on a web log is written or various files are downloaded, it is necessary to authenticate whether or not these are executed based on operations by a person.

As an example of a technique for the above authentication, a so-called CAPTCHA technique is known. With this CAPTCHA technique, numbers or characters which have broken shapes or are made partially defective to allow only people to recognize are displayed on a display of a user terminal. Further, when a person who views these numbers and characters inputs, for example, characters the person views and the inputted characters match with characters which are displayed, it is authenticated that the person is actually inputting the characters. The citation list which discloses this CAPTCHA technique includes, for example, following Patent Document 1.

CITATION LIST

Patent Document

Patent Document 1: Japanese Patent Application Laid-Open No. 2008-052727

SUMMARY OF THE INVENTION

Problems to be Solved by the Invention

However, with conventional CAPTCHA techniques including the technique disclosed in above Patent Literature 1, there are cases where characters have become too defective or have too broken shapes, and therefore people cannot recognize these characters and cannot input correct characters. As a result, there is a problem that, even though an operation is performed by a person, the server cannot correctly recognize that the operation is performed by a person.

Further, with the conventional CAPTCHA techniques, the above characters which have broken shapes are transmitted as an image to a user terminal. Images of the above characters according to the CAPTCHA technique vary every time an authentication screen is transmitted, and therefore cannot be cached in the user terminal. Hence, images according to the CAPTCHA technique are transmitted to the user terminal every time, thereby causing a factor of increasing a network load.

The present invention is made in view of the above problem, and an example of the object of the present invention is to provide an authentication server device, an authentication server device-use program and an authentication method which can easily and accurately determine whether or not, for example, a user terminal is operated by a person.

Means for Solving the Problem

In order to achieve the above object, an authentication server apparatus that is connected to a terminal provided with a display through a network, the authentication server apparatus may comprise: an operation storage that associates and stores an operating instruction and operation information, the operating instruction including text information that instructs an operator of the terminal to perform an operation on the display, the operation information including a position on the display matching the operation and comprising content matching content of the corresponding operating instruction; a session ID assigner that assigns a session ID per session with respect to the terminal that displays a page comprising the operating instruction and an object displayed on the display for the operation; an operation instruction selector that selects the operating instruction per session; a page transmitter that transmits the page comprising the selected operating instruction, the object displayed on the display for the operation matching the operating instruction, the session ID and a position information transmitter that transmits position information indicating a position matching the operation executed in the terminal that displays the page, to the authentication server apparatus; a position information receiver that receives the position information from the terminal; an associator that associates the operating instruction provided in the page displayed in the session and the position information received from the terminal in the session, based on the session ID included in an authentication request received from the terminal that displays the page; and a determiner that determines whether or not the operation is performed by the operator based on the operation information associated with the operating instruction associated with the position information and stored in the operation storage, and the position information.

In order to achieve the above object, an authentication method executed in an authentication server apparatus that is connected to a terminal may comprise a display, through a network, the authentication method comprising: an operation storing step of associating and storing an operating instruction and operation information, the operating instruction including text information that instructs the operator of the terminal to perform an operation on the display, the operation information including a position on the display matching the operation and that comprises content matching content of the corresponding operating instruction; a session ID assigning step of assigning a session ID per session with respect to the terminal that displays a page comprising the operating instruction and an object displayed on the display for the operation; an operation instruction selecting step of selecting the operating instruction per session; a page transmitting step of transmitting the page comprising the selected operating instruction, the object displayed on the display for the operation matching the operating instruction, the session ID and a position information transmitter that transmits position information indicating a position matching the operation executed in the terminal that displays the page, to the authentication server apparatus; a position information receiving step of receiving the position information from the terminal; an associating step of associating the operating instruction provided in the page displayed in the session and the position information received from the terminal in the session, based on the session ID included in an authentication request received from the terminal that displays the page; and a determining step of determining whether or not the operation is performed by the operator based on the operation information associated with the operating instruction associated with the position information and stored, and the position information.

In order to achieve the above object, the authentication server apparatus may perform the operation using a pointing device that is operated by the operator at the terminal.

In order to achieve the above object, the authentication server apparatus may transmit, using the page transmitter, the page comprising a position information transmitter that transmits to the authentication server apparatus the position information indicating a position of an instruction indicator that can be moved by the operator, on the display, and plurality of objects that can be selected according to the instruction indicator; the authentication server apparatus may further comprise: a position information storage that, every time the position information is received, stores the received position information per session ID and reception time; and a flag setter that, when the position information stored in the position information storage and position information stored at a time before the position information are different in the same session ID, sets a manual operation flag indicating that movement of the instruction indicator is operated by the operator of the terminal; wherein the determiner determines whether or not the movement of the instruction indicator is operated by the operator, based on the manual operation flag, the operation information and the position information when receiving the authentication request.

In order to achieve the above object, the authentication server apparatus may transmit, using the page transmitter, the page comprising a plurality of objects that can be selected and moved on the display by the operator and the position information transmitter that transmits to the authentication server apparatus the position information indicating a position of the object on the display; the authentication server apparatus may comprise: a position information storage that, every time the position information is received, stores the received position information per session ID and reception time; and a flag setter that, when the position information stored in the position information storer and position information stored at a time before the position information are different in the same session ID, sets a manual operation flag indicating that movement of the object is operated by the operator of the terminal; wherein the determiner determines whether or not the movement of the object is operated by the operator, based on the manual operation flag, the operation information and the position information when receiving the authentication request.

In order to achieve the above object, the authentication server apparatus may avoid transmitting, by the position information transmitter in the page, the position information at a point of time when the page is displayed in the terminal, and start transmitting the position information when one arbitrary object of the plurality of objects is selected.

In order to achieve the above object, the authentication server apparatus may further comprise a flag returner that returns the manual operation flag to the terminal every time the position information is received, wherein, when the terminal transmits the position information, the page transmitter transmits the page further comprising a position information transmission stopper that stops transmitting the position information when the terminal receives the manual operation flag indicating that the operation is performed by the operator.

In order to achieve the above object, the authentication server apparatus, when the terminal transmits the position information and receives the manual operation flag indicating that the operation is performed by the operator, may transmit, using the page transmitter, the page further comprising an authentication request method displayer that displays on the display a request transmitter that transmits the authentication request to the authentication server apparatus.

In order to achieve the above object, a program for an authentication server apparatus may cause a computer that is connected to a terminal comprising a display, through a network and that is included in the authentication server apparatus to function as: an operation storage that associates and stores an operating instruction and operation information, the operating instruction including text information that instructs the operator of the terminal to perform an operation on the display, the operation information including a position on the display matching the operation and that comprises content matching content of the corresponding operating instruction; a session ID assigner that assigns a session ID per session with respect to the terminal that displays a page comprising the operating instruction and an object displayed on the display for the operation; an operation instruction selector that selects the operating instruction per session; a page transmitter that transmits the page comprising the selected operating instruction, the object displayed on the display for the operation matching the operating instruction, the session ID and a position information transmitter that transmits position information indicating a position matching the operation executed in the terminal that displays the page, to the authentication server apparatus; a position information receiver that receives the position information from the terminal; an associator that associates the operating instruction provided in the page displayed in the session and the position information received from the terminal in the session, based on the session ID included in an authentication request received from the terminal that displays the page; and a determiner that determines whether or not the operation is performed by the operator based on the operation information associated with the operating instruction associated with the position information and stored in the operation storage, and the position information.

Effect of the Invention

According to the present invention, a page having an operating instruction including text information and objects displayed for an operation according to the operating instruction is displayed in the terminal, and whether or not the operation is performed by an operator of the terminal is determined based on position information indicating the position matching the operation performed in this terminal and operation information associated with this operating instruction.

Consequently, it is possible to easily and accurately determine that an operation in a terminal which displays a page having the operating instructions and objects is performed by the operator (that is, a person) of the terminal (in other words, an operation is not inputted by automatic processing by, for example, a bot). More specifically, even when trying to perform an automatic processing against the present invention, content of the operating instruction including text information needs to be analyzed, so that it is possible to make this automatic processing difficult.

Further, the operating instruction provided in the page transmitted to the terminal in a session includes text information and the object displayed for the operation according to the operating instruction can be cached, so that it is possible to suppress a load on the network connected with the terminal compared to a case where an image for authentication is transmitted every time the authentication screen is transmitted as in the conventional CAPTCHA technique.

Furthermore, the operating instruction is selected per session, so that the operating instruction varies per session and, consequently, it is possible more reliably determine whether or not the operation in the terminal is performed by the operator.

MODES FOR CARRYING OUT THE INVENTION

Next, embodiments for implementing the present invention will be described based on the accompanying drawings. In addition, each of the following embodiments is an embodiment where the present invention is applied to an authentication system which authenticates whether or not data outputted from a user terminal is outputted based on an operation by a person or is automatically outputted by a program.

(I) First Embodiment

Figure 1:
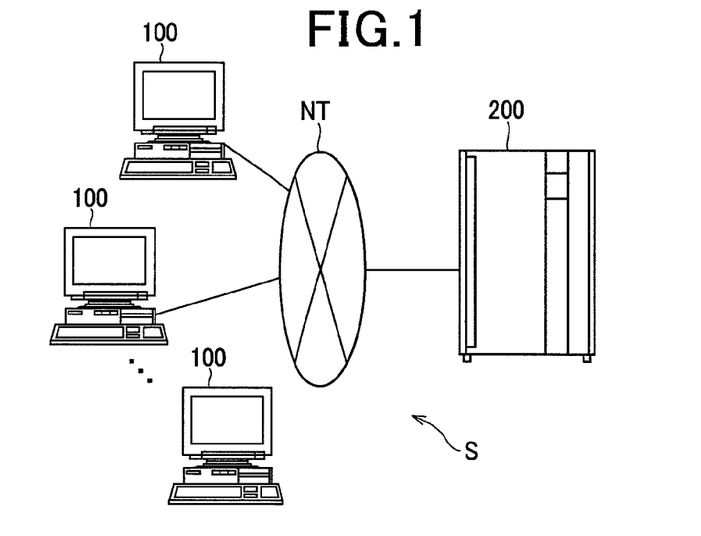
FIG. 1 is a block diagram illustrating a schematic configuration of an authentication system according to the present invention.
Figure 2:
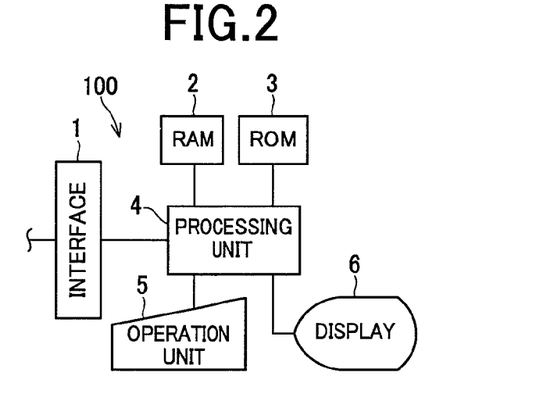
FIG. 2 is a block diagram illustrating a detailed configuration of a user terminal according to the present invention.
Figure 3:
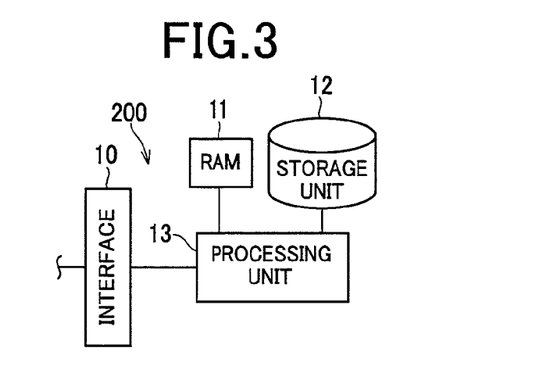
FIG. 3 is a block diagram illustrating a detailed configuration of a server according to the present invention.
Figure 4:
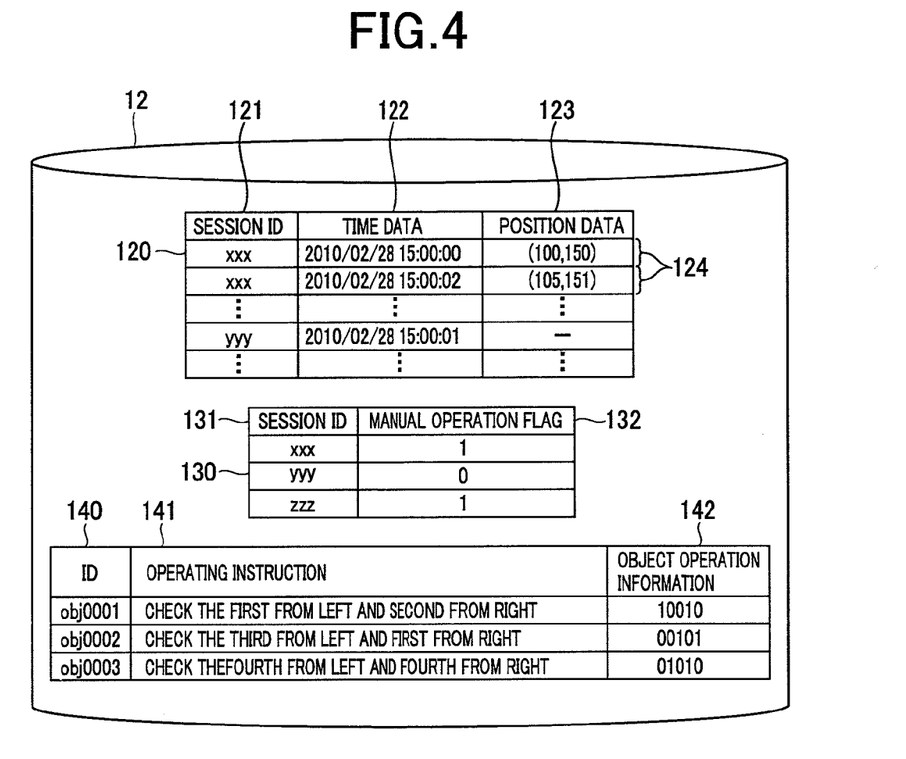
FIG. 4 is a view illustrating storage content of a storage unit according to the present invention.

First, the first embodiment according to the present invention will be described using FIGS. 1 to 10. In addition, FIG. 1 is a block diagram illustrating a schematic configuration of an authentication system according to the first embodiment, and FIG. 2 is a block diagram illustrating a detailed configuration of a user terminal according to the first embodiment. Further, FIG. 3 is a block diagram illustrating a detailed configuration of a server according to the first embodiment, and FIG. 4 is a view illustrating storage content of a storage unit according to the first embodiment. Furthermore, FIGS. 5 to 8 are flowcharts illustrating authentication processing according to the first embodiment, respectively, FIG. 9 is a flowchart illustrating details of authentication processing and FIG. 10 includes views illustrating operation screen examples displayed in a user terminal during the authentication processing.

As illustrated in FIG. 1, an authentication system S according to the first embodiment is configured by connecting one or plural user terminals 100 which are examples of terminals, and a server 200 which is an example of an authentication server device, through a network NT such as Internet.

With this configuration, as illustrated in FIG. 2, the user terminal 100 is configured to include an interface 1, a Random Access Memory (RAM) 2, a Read Only Memory (ROM) 3, a processing unit 4 having a Central Processing Unit (CPU) and the like, an operation unit 5 having a pointing device such as a mouse or touch panel and a keyboard, and a display 6 which is an example of a display means such as a liquid crystal display.

Figure 10A:
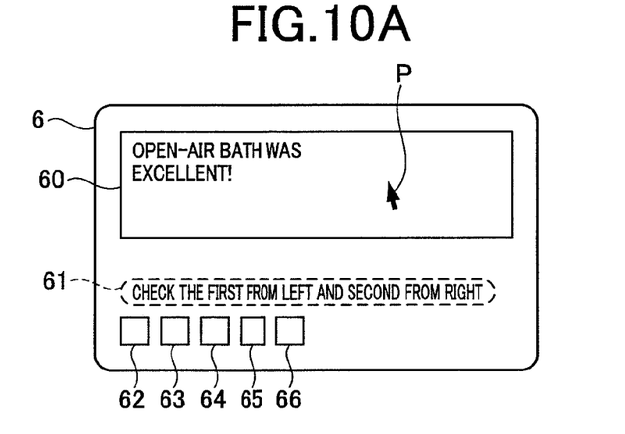
FIG. 10A is a view illustrating a first example of an operation screen example displayed in the user terminal during authentication processing according to the first embodiment.
Figure 10B:
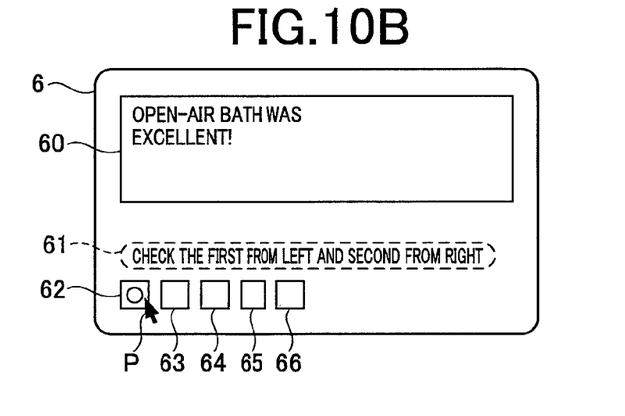
FIG. 10B is a view illustrating a second example of the operation screen example displayed in the user terminal during authentication processing according to the first embodiment.
Figure 10C:
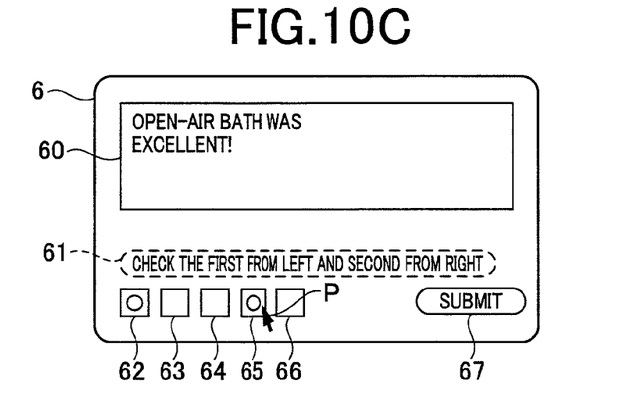
FIG. 10C is a view illustrating a third example of the operation screen example displayed in the user terminal during authentication processing according to the first embodiment.

In this case, the interface 1 controls transmission and reception of data to and from the server 200 through the network NT. In the ROM 3, a program which causes the processing unit 4 to execute authentication processing described below, and required data are stored in a nonvolatile state. Further, the processing unit 4 reads and executes, for example, the above program stored in the ROM 3 based on the operation executed in the operation unit 5 and page data which will be described below and received from the server 200. In this case, the RAM 2 temporarily stores data required to display pages in the processing unit 4. Further, the display 6 displays the operation screens illustrated in FIG. 10 described below.

By contrast with this, as illustrated in FIG. 3, the server 200 has an interface 10 which is an example of a position information receiving means, a RAM 11, a storage unit 12 which is an example of a position information storage means including a nonvolatile storage medium such a hard disk and an example of an operation storage means, and a processing unit 13 which is an example of an operating instruction selecting means having the CPU and the like, an example of a page transmitting means, an example of a flag setting means, an example of a session ID assigning means, an example of an associating means and an example of a determining means. With this configuration, the interface 10 controls transmission and reception of data with respect to each of user terminals 100 through the network NT. The storage unit 12 stores programs which cause the processing unit 13 to execute authentication processing according to the first embodiment and required data in a nonvolatile state in addition to a temporal position information database, a manual operation information database and an object operation database which will be described using FIG. 4 below. Further, the processing unit 13 executes authentication processing by reading and executing, for example, the above program stored in the storage unit 12, based on, for example, the following position data transmitted from the user terminal 100. In this case, the RAM 11 temporarily stores data required for the authentication processing in the processing unit 13.

Next, details of each database stored in the storage unit 12 will be described using FIG. 4.

First, as illustrated in FIG. 4, in the temporal position information database 120, position data which will be described below, and transmitted from the user terminal 100 on a regular basis is accumulated, the user terminal 100 being an authentication target. That is, as illustrated in FIG. 4, one temporal position data 124 is configured with a session ID 121 for identifying the user terminal 100 among other user terminals 100 in the session in which the user terminal 100 and server 200 are connected, position data 123 which indicates the position of the pointer which is on the display 6 and which is an example of an instruction indicator such as a mouse pointer displayed on the display 6 of the user terminal 100, and time data 122 which indicates a date and time matching the session ID 121 and position data 123. In this position data 123, the position of the pointer on the display 6 is described which is represented by the coordinate system where, for example, the upper leftmost coordinate on the display 6 of the user terminal 100 is the original point (0,0), the horizontal direction upon use of the display 6 is the X axis and the vertical direction upon use is the Y axis. Meanwhile, although the session ID is used to identify the user terminal 100 among the other user terminals 100 in a session, the browser displayed in the user terminal 100 may be identified among other browsers in this session by session ID.

As illustrated in FIG. 4, in the manual operation information database 130, a manual operation flag 132 matched with the session ID 131 of the temporal position information database 120 is stored. This manual operation flag 132 is set to, for example, "1" when the operation of the pointer on the user terminal indicated by the session ID is determined as an operation by the operator (that is, a person) of the user terminal 100, and is set to, for example, "0" when the operation is determined as the operation which is not performed by the operator.

As illustrated in FIG. 4, in the object operation information database 140, object operation information 142 matched with the operating instruction 141 is stored. The object operation information 142 is used to verify the object selection information or object selection movement information transmitted to the server 200 when the operator performs an operation according to the operating instruction 141 displayed in the user terminal 100.

Next, authentication processing executed in the authentication system S will be specifically described using FIGS. 5 to 10. In addition, authentication processing described below is executed as part of processing of writing a review article about a hotel using a review page which allows the user who operates the user terminal 100 to write the a review article about the hotel.

Figure 5:
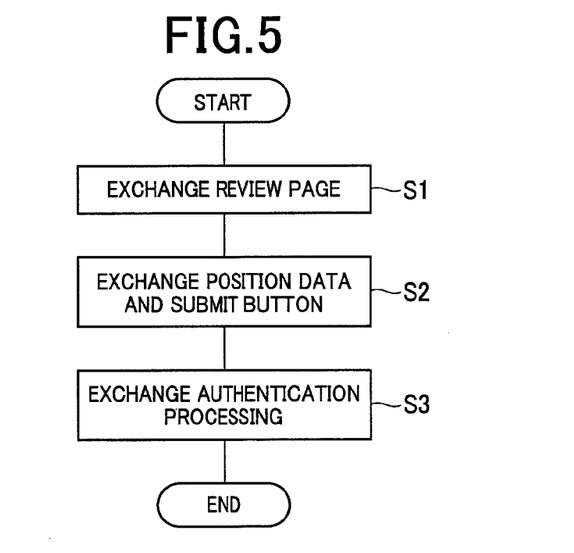
FIG. 5 is a flowchart illustrating an overview of an exchange of processing between a server and a user terminal according to the present invention.

As illustrated in FIG. 5, with authentication processing according to the present invention, a review page is exchanged between the user terminals 100 and server 200 (step S1). Then, the position data 123 and submit button 67 are exchanged (step S2), and an exchange in authentication processing is finally performed (step S3).

Figure 6:
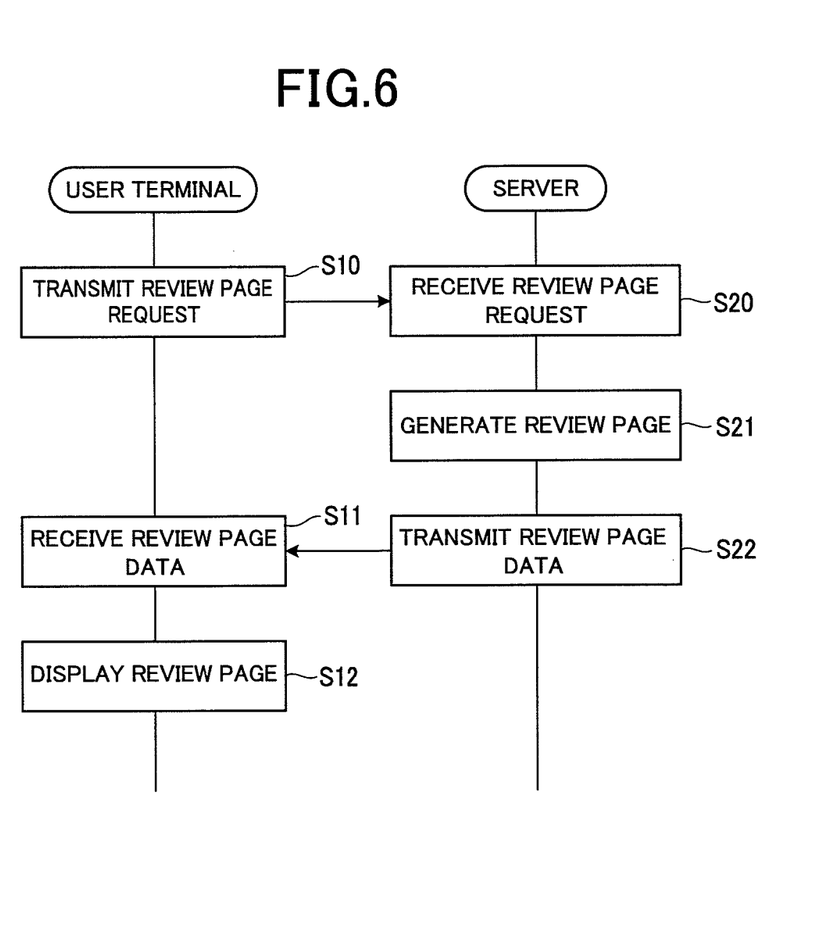
FIG. 6 is a sequence diagram illustrating processing such as page display according to a first embodiment.

Next, an exchange of a review page (step S1) will be described more specifically using FIG. 6. FIG. 6 illustrates processing in step S1 in FIG. 5 in details, and is a flowchart illustrating an exchange of data between the user terminal 100 which requests a review page to be displayed and server 200 which generates review pages.

First, the user terminal 100 transmits a request for displaying the review page, to the server 200 (step S10). The server 200 which received the request (step S20) generates a review page having a position information transmitting means according to the first embodiment (step S21). This review page functions as a position information transmitting means to have a script for transmitting the position data 123 indicating the position of, for example, the pointer on the display 6 from the user terminal 100 to the server 200 on a regular basis. In addition, this position data 123 may not be transmitted to the server 200 on a regular basis but may be transmitted at a predetermined timing set in advance. In the review page, a comment column 60 for writing a review article, the above operating instruction 61 for the user and objects 62 to 66 used for authentication are displayed. The comment column 60 allows the user to freely write a review article therein. The operating instruction 61 contains a phrase which requests the user to select an object (see the operating instruction 141 in FIG. 4). More specifically, for example, a script for transmitting the position data 123 of the mouse pointer to the server 200, for example, every other second is embedded. Further, the operating instruction 141 matching the operating instruction 61 described below is extracted from the object operation information database 140 to generate a review page. The server 200 which generated the review page returns page data of the review page generated by processing in step S21, to the user terminal 100 (step S22). The user terminal 100 which received this page data (step S11) displays the review page on the display 6 (step S12).

Meanwhile, the function of the review page displayed on the display 6 as a result of execution of step S12 in FIG. 6 will be specifically described using FIG. 10.

As illustrated in, for example, FIG. 10A, in the review page, the comment column 60 for writing a review article, the above operating instruction 61 for the user, and the objects 62 to 66 which are used for authentication are displayed. The comment column 60 allows the user to freely write a review article therein. The operating instruction 61 contains a phrase which requests the user to select an object (see the operating instruction 141 in FIG. 4). As illustrated in FIG. 4, there are plural types of phrases included in the operating instruction 61, and a correct pattern varies per type of a phrase. Moreover, in addition to the phrase illustrated in FIGS. 4 and 10A, this operating instruction 61 may include a predetermined image according to the phrase. The objects 62 to 66 are selection frame objects which display "○" when the user selects the object by operating a pointer P using, for example, a mouse which is not illustrated and forms the operation unit 5. These objects 62 to 66 can be commonly used for plural types of operating instructions 61 having different contents as described below. Hence, object data corresponding to these objects can be cached in a storage unit which includes the RAM 2 or a nonvolatile storage medium of the user terminal 100 and which is not illustrated in FIG. 2.

Figure 7:
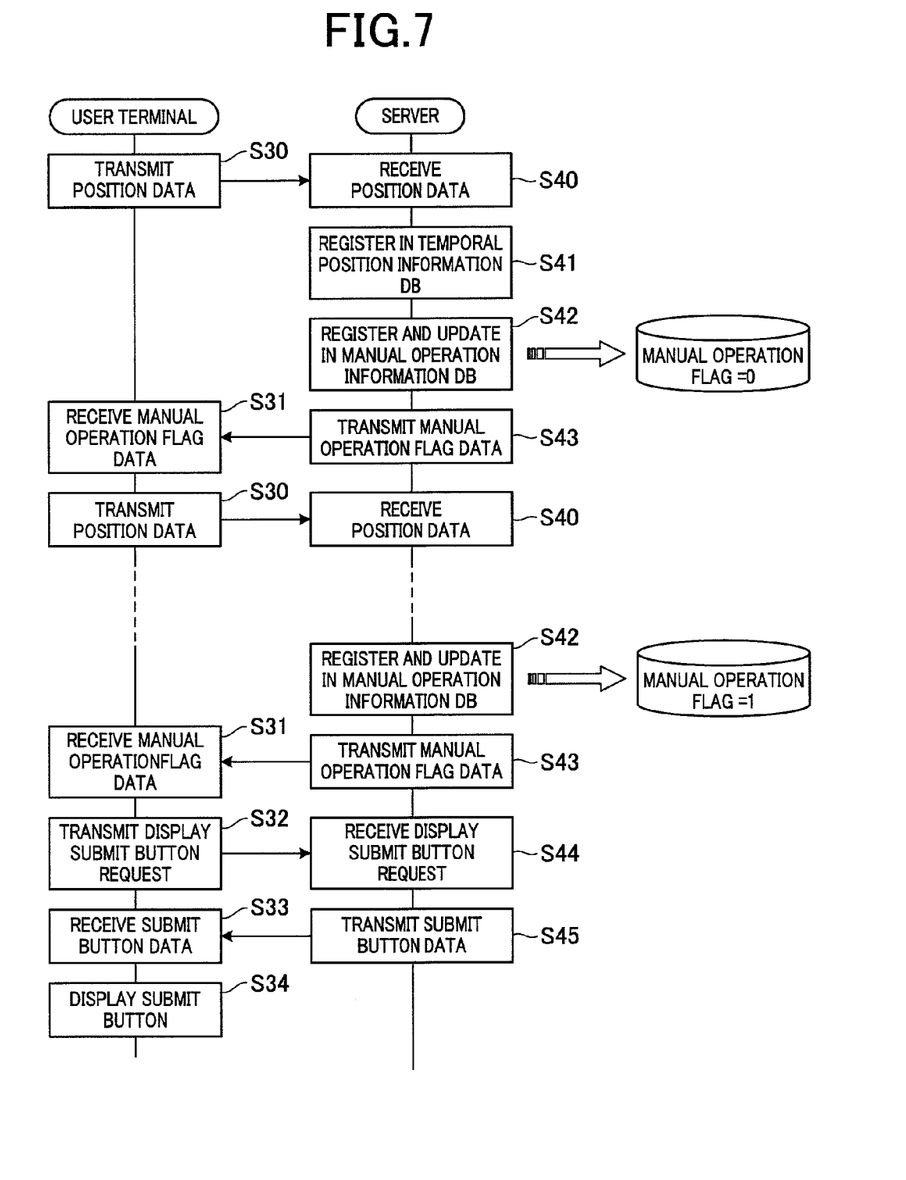
FIG. 7 is a sequence diagram illustrating processing of transmission and reception of position data and the like according to the first embodiment.

Next, an exchange of the position data 123 and operation button 67 in step S2 in FIG. 5 will be more specifically described using FIGS. 7 and 10. In addition, FIG. 7 illustrates processing in step S2 in FIG. 5 in details, and is a flowchart illustrating an exchange of data between the user terminal 100 which transmits pointer position data or requests submit button data and server 200 which returns a manual operation flag or submit button data.

The operator selects the object 62 according to the operating instruction 61 in FIG. 10A. FIG. 10B illustrates a screen immediately after the object 62 is selected. When the object 62 is selected, the user terminal 100 starts processing of repeating transmission of pointer position data to the server 200 on a regular basis (step S30). The pointer position data refers to the position data 123 which indicates the position of the pointer P on the display 6 illustrated in FIG. 10. More specifically, the user terminal 100 repeats processing of transmitting the position data 123 of the pointer P to the server 200 per second, for example.

In addition, although the user terminal 100 starts processing of repeating transmission of pointer position data on a regular basis when the object 62 is selected, the object is by no means limited to the object 62, and one of the objects 63 to 66 may be selected. When processing of repeating transmission of pointer position data on a regular basis is started by selecting one of the objects, it is possible to reduce a processing load on the user terminals 100 or server 200, and reduce the load on the network connecting the user terminals 100 and server 200.

Further, even if the objects 62 to 66 are not selected, the user terminal 100 may start processing of repeating transmission of pointer position data on a regular basis from the point of time when a review page is displayed.

The server 200 which received the position data 123 transmitted from the user terminal 100 registers the transmitted position data 123, in the temporal position information database 120 using the session ID 121 of the user terminal 100 and time data 122 indicating the current time (step S41). The server 200 receives the position data 123 on a regular basis and registers the position data 123 in the temporal position information database 120, so that, as illustrated in FIG. 4, in the temporal position information database 120, the position data 123 at different times is sequentially added and registered in each session ID 121.

The server 200 monitors content of the temporal position information database 120 at all times, and sets the manual operation flag 132 of the manual operation information database 130 based on the monitoring result (step S42). More specifically, the server 200 monitors whether or not there are two types of the position data 123 or more at different times in the same session ID 121 in the temporal position information database 120. If there is no position data 123 at different times in the same session ID 121, the manual operation flag 132 is registered in the manual operation information database 130 as a value "0" using the session ID 121. By contrast with this, if there are items of position data 123 at different times in the same session ID 121, these items of position data 123 are compared and, if these items of position data 123 are different, the manual operation flag 132 matching the session ID 131 in the manual operation information database 130 is updated as the value "1". That is, the server 200 decides whether or not an operation is performed based on the difference in the position data 123, and, when deciding that the operation is performed by a person, sets the manual operation flag 132 of the manual operation information database 130 to, for example, "1".

The server 200 returns the value of the manual operation flag 132 set in the manual operation information database 130 in step S42, to the user terminal 100 (step S43). The user terminal 100 receives the value of the manual operation flag 132 (step S31). The above processing in steps S30 and S31 in the user terminal 100 and in steps S40 to S43 in the server 200 are repeated every time the user terminal 100 receives the manual operation flag 132 of "0".

By contrast with this, when the manual operation flag 132 received from the server 200 is "1", the user terminal 100 stops transmitting the position data 123 on a regular basis, and transmits a submit button display request for requesting submit button data for displaying the submit button in a review page, to the server 200 (step S32). The server 200 which received the submit button display request (step S44) returns submit button data for displaying the submit button, to the user terminal 100 (step S45). As illustrated in FIG. 10C, the user terminal 100 which received the submit button data displays a submit button 67 in a review page (step S34). Consequently, the operator can click the submit button 67 after inputting a review comment.

The operator selects the object 62 at the point of time in FIG. 10B. Next, the operator selects the object 65 which is the second from the right, according to the operating instruction 61. In this case, while the operator moves the mouse pointer from the object 62 to the object 65, the user terminal 100 transmits the position data 123 of the mouse pointer to the server 200 during movement of the mouse pointer, so that different items of position data 123 are registered in the temporal position information database 120. In this case, there are different items of position data 123 at different times in the same session ID, so that the manual operation flag 132 is updated as "1". When the server 200 returns the manual operation flag 132 which indicates "1" to the user terminal 100, the user terminal 100 which received the manual operation flag 132 transmits the submit button display request. The server 200 which received the submit button display request returns submit button data, to the user terminal 100. Consequently, when the operator moves the mouse pointer from the object 62 to the object 65, the submit button 67 which was not displayed in a review page is displayed as illustrated in FIG. 10C.

Next, with the authentication processing according to the present invention, an exchange in authentication processing is performed between the user terminal 100 and server 200 (see step S3 in FIG. 5).

Figure 8:
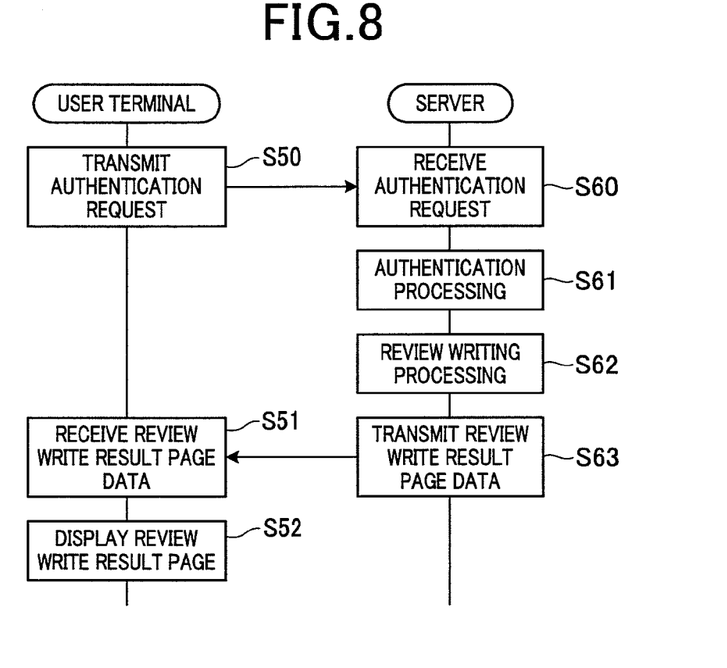
FIG. 8 is a sequence diagram illustrating processing of an authentication request in authentication processing according to the first embodiment.
Figure 9:
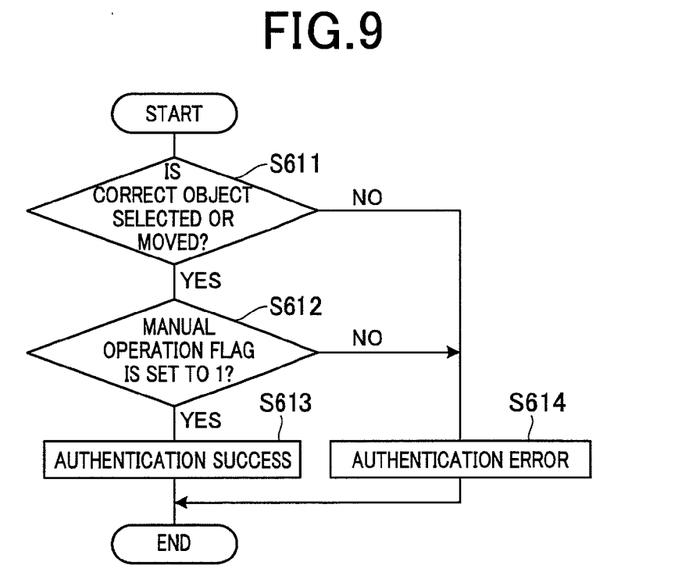
FIG. 9 is a flowchart illustrating details of authentication processing according to the first embodiment.

An exchange in the authentication processing in step S3 in FIG. 5 will be specifically described using FIG. 8. FIG. 8 is a flowchart illustrating details of an exchange in the authentication processing between the user terminal 100 which requests authentication and the server 200 which performs authentication.

When the operator clicks the submit button 67 displayed in FIG. 10C, the user terminal 100 transmits an authentication request to the server 200 (step S50). Further, the server 200 which received the authentication request (step S60) executes authentication processing (step S61).

The user terminal 100 transmits object selection information to the server 200 upon transmission of the authentication request (step S50). The server 200 receives the authentication request and object selection information (step S60). FIG. 9 is a view illustrating authentication processing (step S61) in details. In FIG. 9, whether or not an object selection portion matching the operating instruction 141 in the object operation information database 140 and the object selection information received in step S60 matches is determined (step S611). If a match is found (step S611; YES), the manual operation flag 132 is determined (step S612) in the next, and, if a match is not found (step S611; NO), this is regarded as an authentication error (step S614). The manual operation flag 132 is determined by determining whether or not the manual operation flag 132 acquired from the manual operation information database 130 is "1" using a session ID associated with a session with respect to the user terminal 100 as a key (step S612). When the manual operation flag 132 is "1", that is, it is determined that an operation is performed by the operator (step S612; YES), it is regarded that authentication is successful (step S613). When the manual operation flag 132 is not "1", that is, when it is determined that the operation is not performed by the operator (step S612; NO), it is regarded that authentication causes an error (step S614). As described above, by determining the two types of the object selection portion and manual operation flag 132, whether or not the operation is performed by the operator is determined. Although the manual operation flag 132 is determined after the object selection portion is determined, the order is by no means limited to this order, the order may be inverse or the object selection portion and manual operation flag may be determined at the same time.

If authentication is successful, processing of writing a review is executed (step S62), and a write result page is returned to the user terminal 100. The user terminal 100 which received the write result page (step S51) displays the write result page (step S52). By contrast with this, when authentication causes an error, for example, an error message which is not illustrated is returned to the user terminal 100 without executing processing of writing a review.

As described above, with processing of the authentication system S according to the first embodiment, a review page having the operating instruction 61 including text information and the objects 62 to 66 matching the operating instruction 61 is displayed in the user terminal 100, and whether or not the operation is performed by the operator of the user terminal 100 is determined based on object selection information indicating the operation (that is, movement of the pointer P) executed in the user terminal 100 and object operation information 142 associated with the operating instruction 61, so that it is possible to easily and accurately determine that the operation in the user terminal 100 is performed by the operator (that is, a person), in other words, the operation is not inputted by automatic processing of, for example, a bot.

Further, the operating instruction 61 provided in a page displayed in the user terminal 100 is text information, and the objects 62 to 66 displayed for the operation according to the operating instruction 61 can be commonly used for plural types of operating instructions 61 and can be cached in the user terminal 100, so that it is possible to reduce a load on the network connecting the user terminal 100 and server 200 compared to a case where an image such as characters is transmitted for authentication every time the authentication screen is transmitted as in a conventional CAPTCHA technique.

Furthermore, the operation in the user terminal 100 is performed by the operation of moving the pointer P using a mouse, so that it is possible to determine that the operation in the user terminal 100 is performed by the operator with a simple configuration without using a keyboard and complicated image.

Still further, the manual operation flag 132 is set when positions of the pointer P indicated by the position data 123 continuously received by the server 200 are different with each other, and whether or not movement of the pointer P is operated by the operator is determined based on whether or not the manual operation flag 132 is set. Consequently, it is possible to easily and accurately determine that movement of the pointer P is operated by a person.

Further, when the object selection information is equivalent to object operation information matching the operating instruction, and the manual operation flag 132 is set, it is decided that movement of the pointer P is operated by a person. Consequently, it is possible to reliably determine that movement of the pointer P is operated by a person.

(II) Second Embodiment

Figure 11A:
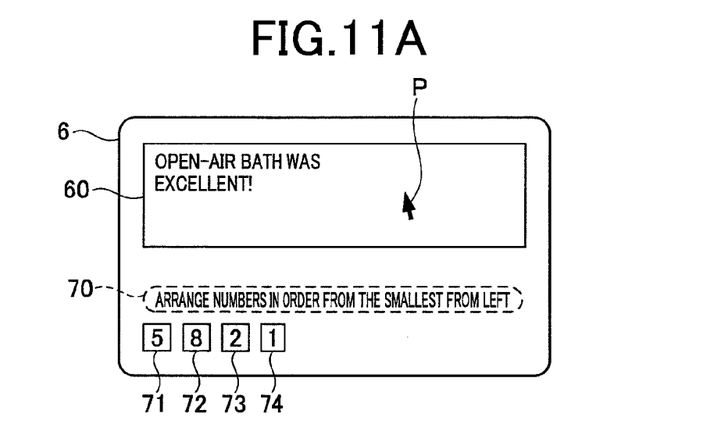
FIG. 11A is a view illustrating a first example of the operation screen example displayed in the user terminal during authentication processing according to a second embodiment.
Figure 11B:
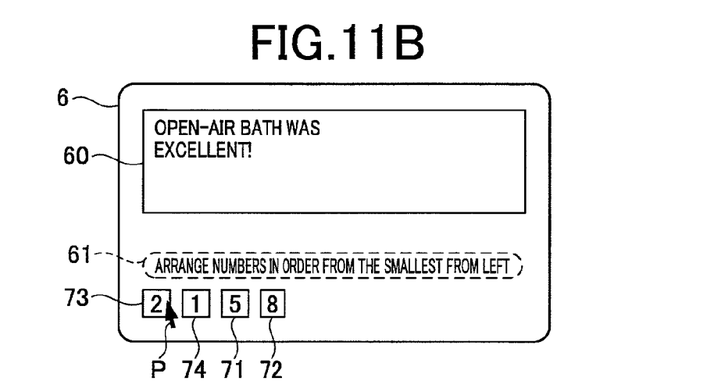
FIG. 11B is a view illustrating a second example of an operation screen example displayed in the user terminal during authentication processing according to the second embodiment.
Figure 11C:
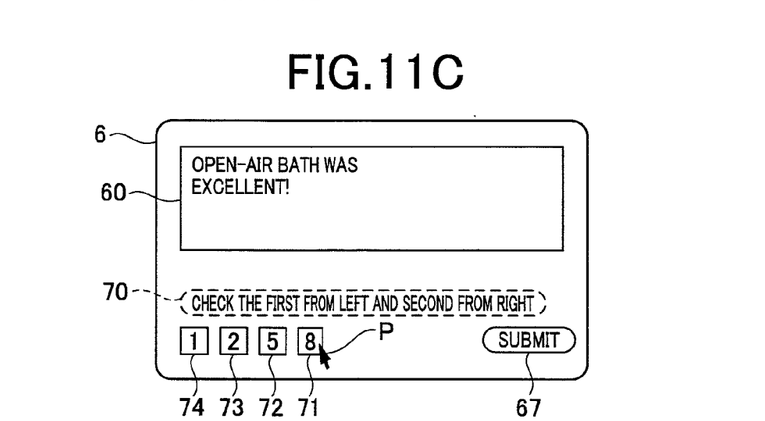
FIG. 11C is a view illustrating a third example of an operation screen example displayed in the user terminal during authentication processing according to the second embodiment.

Next, the second embodiment which is another embodiment according to the present invention will be described using FIG. 11. In addition, FIG. 11 is a view illustrating an operation screen displayed in a user terminal. Further, a hardware configuration of the authentication system according to the second embodiment is basically the same as the hardware configuration of the authentication system S according to the first embodiment, and therefore the second embodiment will be described below with citing reference numerals used to describe the authentication system S according to the first embodiment.

With the above first embodiment, after the pointer P is operated according to the operating instruction 61 (see FIG. 10) and a selection is made from objects 62 to 66 (see FIG. 10), the authentication operation is executed. By contrast with this, with the second embodiment which will be described below, after an object itself displayed on the display 6 is moved according to the operating instruction, the authentication operation is executed. Further, with the second embodiment, instead of position data 123 indicating the position of the pointer P on the display 6 according to the first embodiment, the position data 123 indicating the position of the object itself on the display 6 according to the second embodiment is transmitted from the user terminal 100 to the server 200, and is accumulated in the temporal position information database 120 as the position data 123. Furthermore, an object operation information database 140 according to the second embodiment is, for example, as follows.

TABLE 1

| ID | OPERATING INSTRUCTION | OBJECT OPERATION INFORMATION |
|---|---|---|
| obj1001 | ARRANGE NUMBERS IN ORDER FROM THE SMALLEST FROM LEFT | 1258 |
| obj1002 | ARRANGE NUMBERS IN ORDER FROM THE SMALLEST FROM RIGHT | 2689 |
| obj1003 | ARRANGE NUMBERS IN ORDER FROM THE LARGEST FROM LEFT | 0258 |

(140, 141, 142)

In the authentication processing according to the second embodiment, processing in step S1 in FIG. 5 and processing illustrated in FIG. 6 are executed first. Further, as illustrated in, for example, FIG. 11A, a page displayed on the display 6 as a result of these includes an operating instruction 70 and objects 71 to 74 according to the second embodiment in addition to the same comment column 60 for writing a comment as the first embodiment. The objects 71 to 74 illustrated in FIG. 11A are moved themselves on the display 6 by operation using the above mouse and the like. In addition, FIG. 11A illustrates a state before the operation is executed using the operation unit 5, and therefore the positional relationship among the objects 71 and 74 is different from content indicated by the operating instruction 70. Further, page data of a review page according to the second embodiment includes, for example, object data corresponding to, for example, the above objects 71 to 74, and the above script for transmitting the position data 123 indicating the position of each of the objects 71 to 74, to the server 200, for example, every other second. Similar to the objects 62 to 66 according to the first embodiment, the objects 71 to 74 can be commonly used for plural types of the above operating instructions 70 having different contents. Hence, object data corresponding to these objects can be cached in a storage unit which includes the RAM 2 or a nonvolatile storage medium of the user terminal 100 and which is not illustrated in FIG. 2.

Then, the user terminal 100 and server 200 perform processing in step S2 in FIG. 5 and processing illustrated in FIG. 7. In this case, according to the second embodiment, the position data 123 indicating the position of each of the displayed objects 71 to 74 on the display 6 is transmitted to the server 200. In the position data 123 in this case, similar to the first embodiment, the position of each of the objects 71 to 74 on the display 6 is described which is represented by the coordinate system where, for example, the upper leftmost coordinate on the display 6 of the user terminal 100 is the original point (0,0), the horizontal direction upon use of the display 6 is the X axis and the vertical direction upon use is the Y axis.

Further, as illustrated in FIG. 11, the operation of selecting each of the objects 71 to 74 is executed by selecting the objects 71 to 74 using the pointer P according to content of the operating instruction 70, sequentially moving the objects 71 to 74 to change from FIGS. 11A to 11C and arranging the object 74, object 73, object 71 and object 72 in order from the left. Also during this arranging operation, the position data 123 indicating the position of each of the objects 71 to 74 is transmitted to the server 200. Further, for example, every other second from a timing when the object 71 is moved (see step S30 in FIG. 7), the user terminal 100 repeats processing of transmitting the position data 123 indicating the position of each of the objects 71 to 74 on the display 6, to the server 200 (see step S31 in FIG. 7).

Then, the user terminal 100 and server 200 perform processing in step S3 in FIG. 5 and processing illustrated in FIG. 8.

In addition, although the position data 123 indicating the position of each of the objects 71 to 74 on the display 6 is transmitted to the server 200, the position data 123 of, for example, only the object 71 instead of plural objects may be transmitted to the server 200.

As described above, with processing of the authentication system S according to the second embodiment, in addition to the function and effect of processing of the authentication system S according to the above first embodiment which includes simple and accurate operator determination and reduction of a processing load and a network load, the position of each of the objects 71 to 74 indicated by the position data 123 received by the server 200 sets the manual operation flag 132, and whether or not movement of each of the objects 71 to 74 is operated by the operator is determined based on whether or not the manual operation flag 132 is set. Consequently, even a user terminal such as a smartphone which does not display a mouse pointer can easily and accurately determine that movement of each of the objects 71 to 74 is operated by the operator.

Further, when the manual operation flag 132 is set and the position of each of the objects 71 to 74 is at a position corresponding to content of the operating instruction 70, it is decided that movement of each of the objects 71 to 74 is operated by the operator. Consequently, it is possible to reliably determine that movement of each of the objects 71 to 74 is operated by the operator.

(III) Modified Embodiment

Next, a modified embodiment according to the present invention will be described.

As a first modified embodiment, although whether or not an operation is performed by the operator is determined by two types of determination based on the object selection portion and manual operation flag 132 with each of the above embodiments (see steps S611 and S612 in FIG. 9), additionally, whether or not the operation is performed by the operator may be determined by determination based only on an object selection portion described in processing in above step S611 with the first modified embodiment.

In this case, for example, using a session ID as a key, the session ID being associated with a session with respect to the user terminal 100, the operating instruction 61 or 70 transmitted to the user terminal 100 in this session and the object selection information received from the user terminal 100 are associated with in this session. Next, object operation information associated with the operating instruction 61 or 70 in the object operation information database 140, and object selection information associated with the operating instruction 61 or 70 using the session ID as a key are compared, and, when both pieces of information match, it is determined that the operation is performed by the operator.

Further, in this case, the operating instruction 61 or 70 transmitted to the user terminal 100 per session may be configured to be associated with a session ID and changed, for example, at random. In this case, the operating instruction 61 or 70 which is different every time a new session is established with respect to the user terminal 100 is displayed on the display 6 of the user terminal 100. Further, following the change of the operating instruction 61 or 70, object operation information and object selection information matching the operating instruction 61 or 70 also change every time a session is established, so that it is possible to more reliably determine that the operation in the user terminal 100 is operated by the operator.

Also with the first modified embodiment described above, it is possible to easily and accurately determine that the operation in the user terminal 100 is performed by the operator.

Further, with the common function and effect in processing of the authentication system according to each of the above embodiments and the first modified embodiment (hereinafter, simply referred to as "each of the embodiments"), the conventional CAPTCHA technique changes characters transmitted to the user terminal and make these characters unreadable using, for example, an optical character recognition (OCR) technique to secure that the operation in the user terminal 100 is performed by the operator. By contrast with this, with the authentication system according to each of the embodiments, the authentication operation can be performed using only a pointing device (that is, for example, a mouse or touch panel) provided in the operation unit 5 of the user terminal 100, the operation using a keyboard is not necessary, and, by further using, for example, the objects 62 to 66 which can cache object data in the user terminal 100, characters do not need to be transmitted as an image to the user terminal 100 every time the authentication screen is transmitted, so that it is possible to reliably determine that the operation is performed by the operator without the disadvantages of the conventional CAPTCHA techniques.

Further, when the operation of the operation button 67 is executed in the user terminal 100 after the manual operation flag 132 is set, whether or not the operation is performed by the operator is determined based on whether or not the manual operation flag 132 is set. Consequently, determination is not made until the manual operation flag 132 is set and the submit button 67 is displayed, so that it is possible to more efficiently determine that the operation is performed by the operator.

Further, similarly, with the common function and effect in processing of the authentication system S according to each of the embodiments, the user terminal 100 stops transmitting the position data 123 on a regular basis after submit button data is transmitted to the user terminal 100, so that it is possible to reduce a processing load for transmitting the position data 123 in the user terminal 100, reduce a communication amount between the user terminals 100 and server 200 and reduce a processing load for receiving the position data 123 in the server 200, respectively.

Furthermore, similarly, with the common function and effect in processing of the authentication system S according to each of the embodiments, when one arbitrary object of plural objects is selected, transmission of the position data 123 is started. Consequently, the position data 123 is not transmitted at the point of time when a page is displayed, so that it is possible to reduce a processing load for transmitting the position data 123 in the user terminal 100, reduce the communication amount between the user terminal 100 and server 200 and reduce a processing load for receiving the position data 123 in the server 200, respectively.

In addition, with each of the above embodiments, although transmission of the position data 123 is started after a timing when the object 62 or object 71 is selected or moved, additionally, transmission of the above position data 123 may be started at a timing when a review page according to each embodiment is displayed on the display 6 of the user terminal 100.

Further, in addition to the operation mode according to each of the above embodiments, as a second modified embodiment, by displaying an object ■, an object ▲ and an object ● horizontally in a line at the upper stage of the display 6 while displaying an object □, an object Δ and an object ○ horizontally in a line at the lower stage in the display 6, and displaying an operating instruction indicating an operation which overlays objects of the same shape on the display 6, the operation may be executed by the operator of the user terminal 100.

Figure 12:
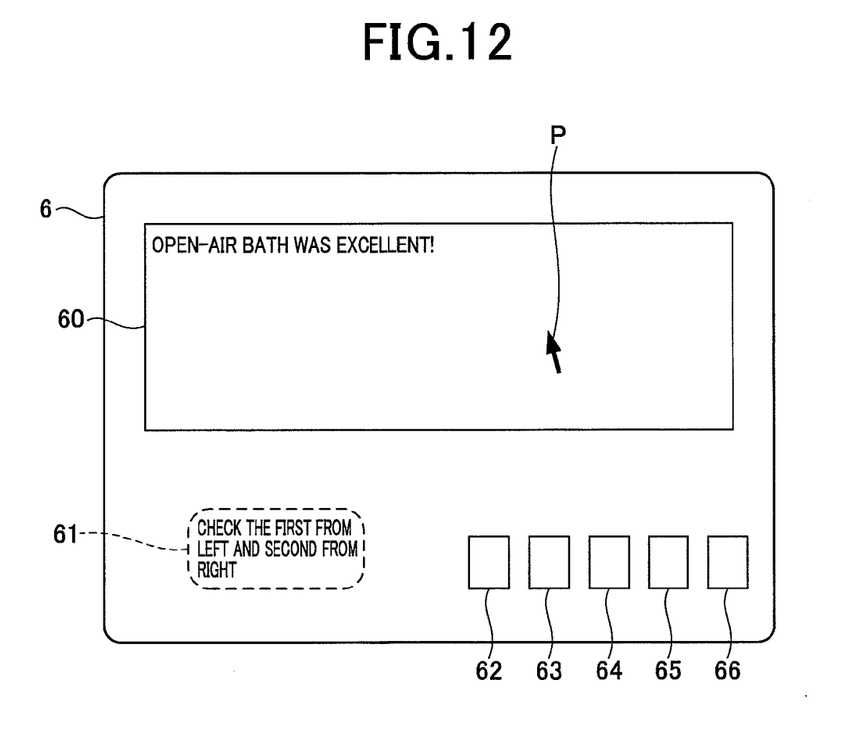
FIG. 12 is a view illustrating an operation screen example displayed in the user terminal during authentication processing according to a third modified embodiment.

Furthermore, as a third modified embodiment, a display position of each object on the display 6 may be configured to change per session between the user terminal 100 and server 200. As illustrated in, for example, FIG. 12 in comparison with FIG. 10A according to the first embodiment, display positions of the objects 62 to 66 may be changed such that the operating instruction 61 and objects 62 to 66 which are arranged vertically in a review page in a given session as illustrated in FIG. 10A, are arranged horizontally in a review page as illustrated in FIG. 12. In this case, when the display position of each object varies per session, a method of determining the display position of each object can be arbitrarily selected. When the display position of each object is fixed, only the vicinity of an object is analyzed by automatic processing by, for example, a bot, and therefore it is likely to be authenticated that, for example, movement of each object is operated by the operator. By contrast with this, with the configuration according to the third modified embodiment, the display position of each object is changed per session, so that automatic processing of analyzing the vicinity of the object by, for example, a bot becomes difficult. By this means, it is possible to more reliably determine that, for example, movement of each object is operated by the operator.

Further, as a fourth modified embodiment, the operation may be executed by the operator of the user terminal 100 by displaying on the display 6 an operating instruction indicating the operation of rearranging objects showing rainbow colors in order of the rainbow together with the objects of the seven colors.

Furthermore, as a fifth modified embodiment, the operation may be executed by the operator of the user terminal 100 by displaying on the display 6 an operating instruction indicating an operation of rearranging objects indicating a baby, an adult and an old people in order of the age together with the objects indicating the baby and the like, respectively.

Still further, by recording a program corresponding to the flowcharts illustrated in FIGS. 5 to 8, respectively, in a recording medium such as flexible disk or hard disk, or acquiring and storing the programs through the network NT and causing a general microcomputer to read and execute the programs, this microcomputer can function as the processing unit 4 and processing unit 13 according to each embodiment.

INDUSTRIAL APPLICABILITY

As described above respectively, the present invention can be utilized in a field of authentication processing between the user terminals 100 and server 200 connected through the network NT, and provides a distinctive effect particularly when applied to a field of authentication processing of authenticating whether or not the user terminal 100 is operated by a person.

DESCRIPTION OF REFERENCE NUMERALS

1, 10: INTERFACE
2, 11: RAM
3: ROM
4, 13: PROCESSING UNIT
5: OPERATION UNIT
6: DISPLAY
12: STORAGE UNIT
60: COMMENT COLUMN
61, 70: OPERATING INSTRUCTION
62, 63, 64, 65, 66, 71, 72, 73, 74: OBJECT
67: SUBMIT BUTTON
100: USER TERMINAL
120: TEMPORAL POSITION INFORMATION DATABASE
121, 131: SESSION ID
122: TIME DATA
123: POSITION DATA
124: TEMPORAL POSITION DATA
130: MANUAL OPERATION INFORMATION DATABASE
132: MANUAL OPERATION FLAG
200: SERVER
S: AUTHENTICATION SYSTEM
NT: NETWORK
P: POINTER

The invention claimed is:

1. An authentication server apparatus that is connected to a terminal provided with a display through a network, the authentication server apparatus comprising:
at least one hardware processor configured to execute modules comprising:
an operation storage that associates and stores an operating instruction and operation information, the operating instruction including text information that instructs an operator of the terminal to perform an operation on the display, the operation information including a position on the display matching the operation and comprising content matching content of the corresponding operating instruction;
a session ID assigner that assigns a session ID per session with respect to the terminal that displays a page comprising the operating instruction and an object displayed on the display for the operation;
an operation instruction selector that selects the operating instruction per session;

a page transmitter that transmits the page, the page comprising the selected operating instruction, the object displayed on the display for the operation matching the operating instruction, the session ID, and a position information transmitter that transmits position information of a pointer from the terminal that displays the page to the authentication server apparatus on a regular basis during the operation in the session, the position information indicating a pointer position in the terminal that displays the page and comprising coordinates representing the pointer position on the display in the terminal, and the position information transmitter beginning transmitting the position information of the pointer when the object displayed on the display for the operation is selected;

a position information receiver that receives the position information transmitted from the terminal by the position information transmitter in the page;

a position information storage that, every time the position information is received, stores the received position information per session ID and reception time; and a flag setter, when the position information stored in the position information storage and position information stored at a time before the position information are different in the same session ID, sets a manual operation flag indicating that movement of the pointer is operated by the operator of the terminal;

an associator that associates the operating instruction provided in the page displayed in the session and the position information received from the terminal in the session, based on the session ID included in an authentication request received from the terminal that displays the page; and a determiner that determines whether or not the operation is performed by the operator, wherein the operator is a person, based on:
   (a) whether or not a comparison of (i) the operation information stored in the operation storage and associated with the operating instruction associated with the position information and (ii) object selection information or object selection movement information indicates that the operator of the terminal has performed the operation on the display instructed by the operating instruction, and
   (b) whether or not the manual operation flag is set, indicating that the operator of the terminal is a person.

2. The authentication server apparatus according to claim 1, wherein the operation is performed using a pointing device that is operated by the operator at the terminal.

3. The authentication server apparatus according to claim 2, wherein:
   the page transmitter transmits the page comprising the position information transmitter that transmits to the authentication server apparatus the position information indicating a position of an instruction indicator that can be moved by the operator, on the display, and a plurality of objects that can be selected according to the instruction indicator.

4. The authentication server apparatus according to claim 2, wherein:
   the page transmitter transmits the page comprising a plurality of objects that can be selected and moved on the display by the operator and the position information transmitter that transmits to the authentication server apparatus the position information indicating a position of the object on the display.

5. The authentication server apparatus according to claim 1, wherein:
   the page transmitter transmits the page comprising the position information transmitter that transmits to the authentication server apparatus the position information indicating a position of an instruction indicator that can be moved by the operator, on the display, and a plurality of objects that can be selected according to the instruction indicator.

6. The authentication server apparatus according to claim 5, wherein
   the position information transmitter in the page does not transmit the position information at a point of time when the page is displayed in the terminal, and starts transmitting the position information when one arbitrary object of the plurality of objects is selected.

7. The authentication server apparatus according to claim 5, further comprising
   a flag returner that returns the manual operation flag to the terminal every time the position information is received, wherein, when the terminal transmits the position information, the page transmitter transmits the page further comprising a position information transmission stopper that stops transmitting the position information when the terminal receives the manual operation flag indicating that the operation is performed by the operator.

8. The authentication server apparatus according to claim 7, wherein,
   when the terminal transmits the position information and receives the manual operation flag indicating that the operation is performed by the operator, the page transmitter transmits the page further comprising an authentication request method displayer that displays on the display a request transmitter that transmits the authentication request to the authentication server apparatus.

9. The authentication server apparatus according to claim 1, wherein:
   the page transmitter transmits the page comprising a plurality of objects that can be selected and moved on the display by the operator and the position information transmitter that transmits to the authentication server apparatus the position information indicating a position of the object on the display.

10. The authentication server apparatus according to claim 1, wherein the pointer position indicated by the position information changes in association with the operation.

11. A non-transitory recording medium which records a program for an authentication server apparatus causing a computer that is connected to a terminal comprising a display unit, through a network and that is included in the authentication server apparatus to function as:
   an operation storage unit that associates and stores an operating instruction and operation information, the operating instruction including text information that instructs the operator of the terminal to perform an operation on the display unit, the operation information including a position on the display unit matching the operation and that comprises content matching content of the corresponding operating instruction;
   a session ID assigning unit that assigns a session ID per session with respect to the terminal that displays a page comprising the operating instruction and an object displayed on the display unit for the operation;
   an operation instruction selecting unit that selects the operating instruction per session;
   a page transmitting unit that transmits the page, the page comprising the selected operating instruction, the object displayed on the display unit for the operation matching the operating instruction, the session ID, and a position information transmitting unit that transmits position information of a pointer from the terminal that displays the page to the authentication server apparatus on a regular basis during the operation in the session, the position information indicating a pointer position in the terminal that displays the page and comprising coordinates representing the pointer position on the display unit in the terminal, and the position information transmitting unit beginning transmitting the position information of the pointer when the object displayed on the display unit for the operation is selected;

a position information receiving unit that receives the position information transmitted from the terminal by the position information transmitting unit in the page;

a position information storage unit that, every time the position information is received, stores the received position information per session ID and reception time; and a flag setting unit that, when the position information stored in the position information storing unit and position information stored at a time before the position information are different in the same session ID, sets a manual operation flag indicating that movement of the pointer is operated by the operator of the terminal;

an associating unit that associates the operating instruction provided in the page displayed in the session and the position information received from the terminal in the session, based on the session ID included in an authentication request received from the terminal that displays the page; and a determining unit that determines whether or not the operation is performed by the operator, wherein the operator is a person, based on:
  (a) whether or not a comparison of (i) the operation information stored in the operation storage unit and associated with the operating instruction associated with the position information and (ii) object selection information or object selection movement information indicates that the operator of the terminal has performed the operation on the display unit instructed by the operating instruction, and
  (b) whether or not the manual operation flag is set, indicating that the operator of the terminal is a person.

12. An authentication method executed in an authentication server apparatus that is connected to a terminal comprising a display unit, through a network, the authentication method comprising:

an operation storing step of associating and storing an operating instruction and operation information, the operating instruction including text information that instructs the operator of the terminal to perform an operation on the display unit, the operation information including a position on the display unit matching the operation and that comprises content matching content of the corresponding operating instruction;

a session ID assigning step of assigning a session ID per session with respect to the terminal that displays a page comprising the operating instruction and an object displayed on the display unit for the operation;

an operation instruction selecting step of selecting the operating instruction per session;

a page transmitting step of transmitting the page, the page comprising the selected operating instruction, the object displayed on the display unit for the operation matching the operating instruction, the session ID, and a position information transmitting unit that transmits position information of a pointer from the terminal that displays the page to the authentication server apparatus on a regular basis during the operation in the session, the position information indicating a pointer position in the terminal that displays the page and comprising coordinates representing the pointer position on the display unit in the terminal, and the position information transmitting unit beginning transmitting the position information of the pointer when the object displayed on the display unit for the operation is selected;

a position information receiving step of receiving the position information transmitted from the terminal by the position information transmitting unit in the page;

a position information storage step of storing, every time the position information is received, the received position information per session ID and reception time; and a flag setting step of setting, when the stored position information and position information stored at a time before the stored position information are different in the same session ID, sets a manual operation flag indicating that movement of the pointer is operated by the operator of the terminal;

an associating step of associating the operating instruction provided in the page displayed in the session and the position information received from the terminal in the session, based on the session ID included in an authentication request received from the terminal that displays the page; and a determining step of determining whether or not the operation is performed by the operator, wherein the operator is a person, based on:
  (a) whether or not a comparison of (i) the operation information stored and associated with the operating instruction associated with the position information and (ii) object selection information or object selection movement information indicates that the operator of the terminal has performed the operation on the display unit instructed by the operating instruction, and
  (b) whether or not the manual operation flag is set, indicating that the operator of the terminal is a person.

* * * * *